Sept. 13, 1949.   W. M. SHERMAN   2,481,628
HOSE COUPLING EXPANDER
Filed Nov. 13, 1946   2 Sheets-Sheet 1
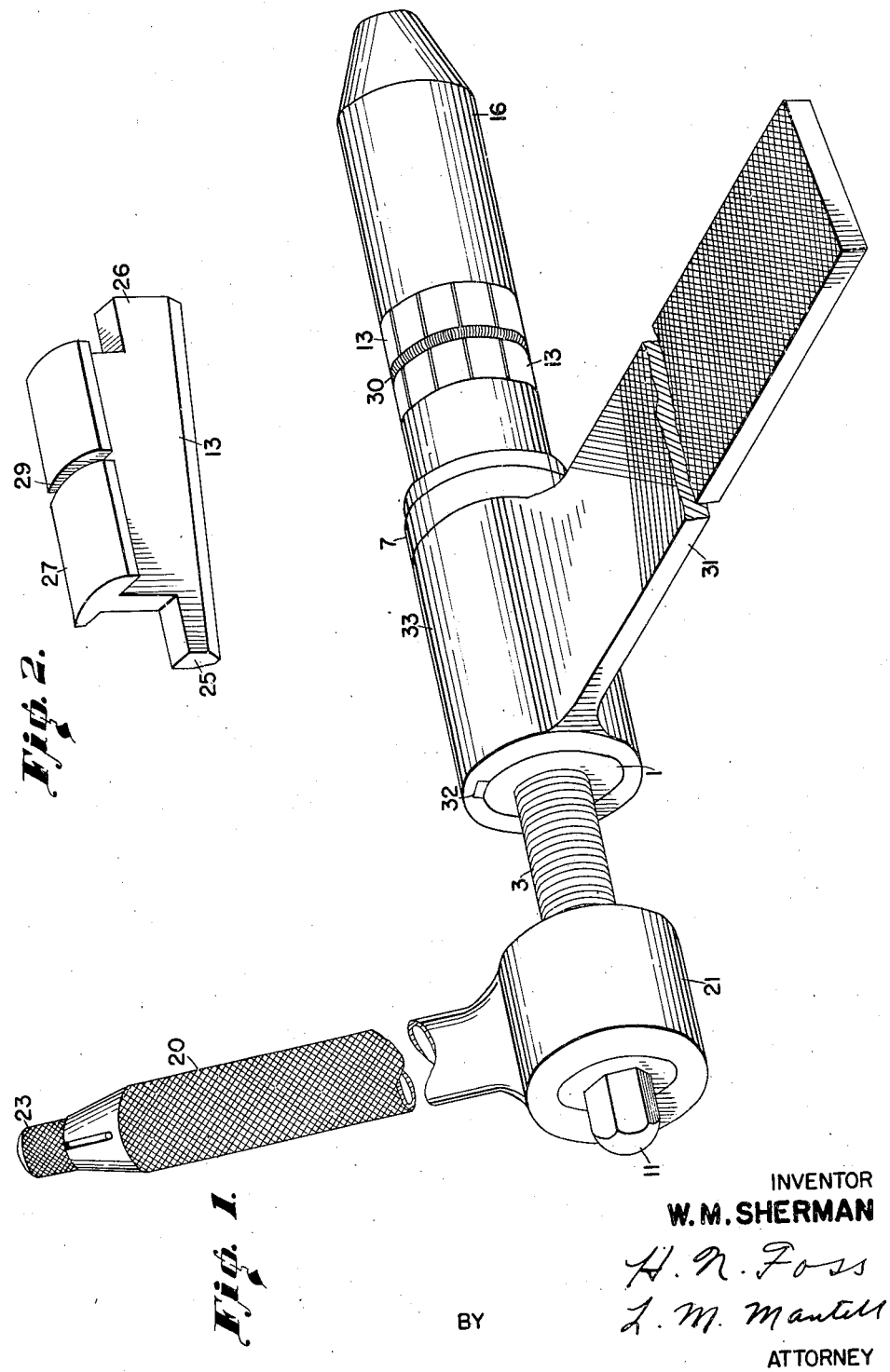
INVENTOR
W. M. SHERMAN
BY H. N. Foss
L. M. Mantell
ATTORNEY Sept. 13, 1949. W. M. SHERMAN 2,481,628
HOSE COUPLING EXPANDER
Filed Nov. 13, 1946 2 Sheets-Sheet 2
INVENTOR
W. M. SHERMAN
BY
H. N. Foss
L. M. Mantell
ATTORNEY Patented Sept. 13, 1949

2,481,628

UNITED STATES PATENT OFFICE 2,481,628

HOSE COUPLING EXPANDER

William M. Sherman, Ketchikan, Territory of Alaska; dedicated to the free use of the People in the territory of the United States Application November 13, 1946, Serial No. 709,630

2 Claims. (Cl. 153—1)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

I hereby dedicate the invention herein described to the free use of the People in the territory of the United States to take effect on the granting of a patent to me.

My invention relates to improvements in an internal wrench that may be conveniently employed for expanding the inner nipple of a hose coupling to clamp the hose between the inner and outer nipples of the coupling.

An object of this invention is to provide a wrench of this type which may be applied manually in the field and with a minimum of force.

A further object is to provide an internal wrench employing expander dogs designed to present an extensive curved surface to the coupling nipple being expanded.

Other objects will become apparent from the following detailed explanation of the preferred form illustrated in the drawings, wherein, Figure 1 is a three-dimensional view of the assembled device;

Figure 2 is a three-dimensional view of one of the expander dogs;

Figure 3 is a face view of the guide for the expander dogs;

Figure 4 is a longitudinal section of the expander of Figure 1, the holder and the ratchet being removed, and a hose coupling shown in position for expansion;

Figure 5 is a longitudinal view partly in section, of the ratchet handle;

Figure 6 is a cross-section of the expander dogs on line 6—6 of Figure 4, the hose and the coupling being omitted.

Referring to Figure 4, shell 1 has an axial cylindrical bore, which is threaded at the left end to receive the jackscrew 3, and has a plain middle section 2. The shell 1 is also provided with a larger axially bored part 4 which is threaded at 5 and has a plain recessed shoulder at 6 which serves as a stop for the expander dogs. Shell 1 is also provided with a flange 7 which serves as a stop for the outer hose coupling rings 8 and 9.

Extending through the tubular jackscrew 3 is a rod 10, detachably secured to which, at one end, is an acorn nut 11 or other detachable fastener that permits rotation of jackscrew 3 upon rod 10. Formed integral with the other end is a conical wedge 12 against which rest or bear the expander dogs 13.

The expander dogs, eight in number, are supported within eight longitudinal slots 14 in hollow guide member 15. The guide member is externally screw-threaded at 15' to fit into threads 5 and at the other end to support the cap 16 which serves as expander dog stop and hose pilot. The expander dogs are first inserted, from the outside, into the slots in the guide member 15. The expander stop and hose pilot 16 is then coupled to the guide member 15, the unthreaded recess or shoulder 17 at one end of the hose pilot 16 serving as a stop for the dogs. The end 15' of the guide member 15 is then coupled to shell 1. The parts may be put together in other orders.

Attached to or integral with the outer end of the jackscrew 3 is the ratchet head 18 which has spaced key slots 19. Ratchet handle 20 contains a spring-pressed ratchet tooth 22 which fits into the slots 19 in the ratchet head. The ratchet tooth may be reversed by pulling the knob 23 up or out and turning it and the attached rod 24. The rod 24 is fixed to the ratchet tooth. Formed on the other end of the ratchet handle is a sleeve 21 which fits over the ratchet head 18.

The inner edge or face of each expander dog is longitudinally inclined at the same slope as the conical wedge. The projecting ears 25 and 26 serve as retaining means which contact the stops 6 and 17 when the dogs are in the completely expanded position. Attached to or integral with the top or outer edge of the dog is a flange 27 having an upper smooth, curved, or cylindrical surface. In the retracted position the curved surfaces of the adjacent dogs are substantially contiguous, forming a cylinder. When the dogs are expanded they project a curved cylindrical surface against the inner coupling nipple 28, thus expanding the same uniformly and with a minimum of distortion of the nipple. The flange 27 is grooved or parted at 29 to serve as a seat for an annular spring 30 which assists in maintaining the flanges of the dogs in alignment, and also to assist in retracting the same upon movement of the conical wedge to the left.

For convenience in manipulation the external diameter of the pilot 16 may be the same as, or slightly smaller than the internal diameter of the coupling nipple 28. Nipple 28 is seated against the end of shell 1. Only limited expansion of the dogs 13 is required to expand the nipple 28.

For ease of manipulation, whether in the field or where a vise is obtainable, a removable holder 31 is provided. A keyway 32 in the holder sleeve 33 slidably receives a key 34 attached to the shell 1. The inner diameter of the holder sleeve is sufficiently large to pass over the ratchet head. The device is conveniently manipulated on the ground by placing one foot on the holder 31 and turning the ratchet handle. If a vise is available holder 31 may be held in it.

Having thus described my invention, I claim:

1. A hose coupling expander comprising a hollow member providing circumferentially spaced longitudinal slots, expander dogs in said slots, longitudinally extending ears on each dog, means provided by the hollow member to serve as stops for said ears to limit outward movement thereof, a circumferentially extending flange on the outer end of each dog, each flange having an outwardly convex surface the axis of which is longitudinally disposed, the longitudinal sides of adjacent flanges being adjacent to each other when the dogs are in retracted position, a longitudinally movable wedge within the hollow member, the inner edges of the dogs resting upon the wedge, the circumferentially extending flanges being retractable inwardly and below the surface of said hollow member upon movement of the wedge in one direction and being moved outwardly upon movement of the wedge in the opposite direction, the flanges being provided with a circumferentially extending groove, and a resilient member within said groove encircling all of the dogs and serving to keep the outer surfaces of the flanges in circular alignment.

2. A hose coupling expander comprising a hollow sleeve providing circumferentially spaced longitudinal slots, expander dogs in said slots, a circumferentially extending flange on the outer end of each dog, each flange having an outwardly convex surface the axis of which is longitudinal to said sleeve, a longitudinally movable wedge within the hollow sleeve, the inner edges of the dogs resting upon the wedge, the dogs being moved in outward direction by movement of the wedge in one direction and being retractable inwardly upon movement of the wedge in the opposite direction, the flanges being provided with a circumferentially extending groove, and a resilient member within said groove encircling all of the dogs and serving to keep the outer surfaces of the flanges in circular alignment, the convex surfaces of the flanges being thereby retractable inwardly to a position such that they do not project beyond the surface of the sleeve.

WILLIAM M. SHERMAN.

REFERENCES CITED

The following references are of record in the file of this patent:

UNITED STATES PATENTS

| Number | Name | Date |
|---|---|---|
| 6,360 | Prosser | Apr. 17, 1849 |
| 743,400 | Sherman | Nov. 3, 1903 |
| 1,306,982 | Walsh | June 17, 1919 |
| 1,423,545 | Smith | July 25, 1922 |
| 1,548,730 | Mirfield | Aug. 4, 1925 |
| 1,675,238 | Walker | June 26, 1928 |
| 1,753,005 | Grady | Apr. 1, 1930 |
| 1,795,487 | Grady | Mar. 10, 1931 |
| 2,155,542 | Graham | Apr. 25, 1939 |
| 2,294,640 | Wallace | Sept. 1, 1942 |
| 2,298,379 | Hoffman | Oct. 13, 1942 |